United States Patent [19]

Helfet

[11] E Re. 29,757

[45] Reissued Sep. 12, 1978

[54] REPLACEMENTS FOR BICONDYLAR JOINTS IN HUMAN LIMBS

[76] Inventor: Arthur Jacob Helfet, 1917 Trust Bank Centre, Capetown, South Africa

[21] Appl. No.: 596,375

[22] Filed: Jul. 16, 1975

Related U.S. Patent Documents

Reissue of:

[64] Patent No.: 3,748,662
Issued: Jul. 31, 1973
Appl. No.: 246,448
Filed: Apr. 21, 1972

[30] Foreign Application Priority Data

Apr. 21, 1971 [GB] United Kingdom ..... 10551/71

[51] Int. Cl.[2] ..... A61F 1/24

[52] U.S. Cl. ..... 3/1.91; 3/1.911; 3/12.2; 3/22; 128/92 C

[58] Field of Search ..... 3/1.9–1.913, 3/1, 12.2, 12.3, 22, 29; 128/92 C, 92 CA, 92 R

[56] References Cited

U.S. PATENT DOCUMENTS

| | | | |
|---|---|---|---|
| 1,421,216 | 6/1922 | Habermann | 3/29 |
| 3,506,982 | 4/1970 | Steffee | 3/1.91 |
| 3,696,446 | 10/1972 | Bousquet et al. | 3/1.911 |

FOREIGN PATENT DOCUMENTS

| | | | |
|---|---|---|---|
| 1,047,640 | 7/1953 | France | 128/92 C |
| 1,122,634 | 5/1956 | France | 128/92 C |
| 1,964,781 | 7/1971 | Fed. Rep. of Germany | 128/92 C |

OTHER PUBLICATIONS

Vitallum Surgical Appliance Catalog, Austenal Medical Division, Howmet Corp., New York, N. Y. 1964, M.G.H. Femoral Condyle Replacements, p. 62.

"Plastics Aid In Medical Teaching", *British Plastics,* vol. 21, No. 247, Dec. 1949, pp. 634 and 635.

"Acrylic Prosthesis Replacing Lower End of the Femur For Benign Giant-Cell Tumor" by G. L. Kraft et al., *The Journal of Bone & Joint Surgery,* vol. 36-A, No. 2, Apr. 1954, pp. 368-374.

"Elbow Reconstruction with a New Prosthesis to Replace the Distal End of the Humerus" by J. S. Barr et al., The Journal of Bone & Joint Surgery, vol. 47-A, No. 7, Oct. 1965, pp. 1408-1413.

*Primary Examiner*—Ronald L. Frinks
*Attorney, Agent, or Firm*—Posnack, Roberts, Cohen & Spiecens

[57] ABSTRACT

A surgical prosthesis or implant for replacing the natural components of a bicondylar joint in a human limb (leg or arm). Thus, a natural knee or elbow joint consists of two pairs of coacting load-bearing condyles. The prosthetic implant has two pairs of coacting male and female condylar components. The male and female components which replace the natural lateral condyles are spherical or spheroidal in shape to simulate a ball and socket joint, while the male and female components which replace the natural medial condyles are constituted by a rib or ridge and a groove. Both the rib and the groove are curved, in a plane normal to the general axis of the limb when straight or extended, to an arc of a circle centered on the center of articulation of the ball and socket, and are also curved in a plane parallel to the limb, the radius of the crest of the rib being less than the radius of the coacting base of the groove. Both male components and both female components can be formed on respective rigid carriers, or they may optionally be separate for individual fixation to the patient's limb.

16 Claims, 10 Drawing Figures

10
O
B
A
X
14
X
12
15
13
b
A
a
11
B 11a
11b
10
Y
Z
Y
Z
11b
10

IV
13
R1
15
O
IV

R2
R3
10
14
15
11

22
24
10
40
16
28
27

25
17
23
11

Fig. 7.
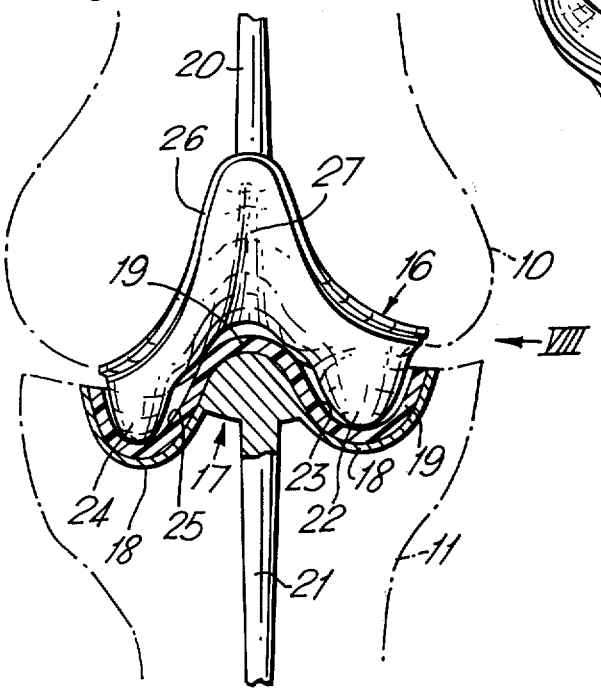
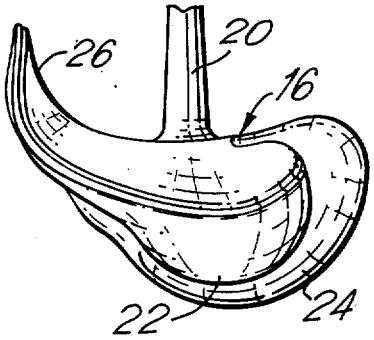
Fig. 8.
Fig. 9.
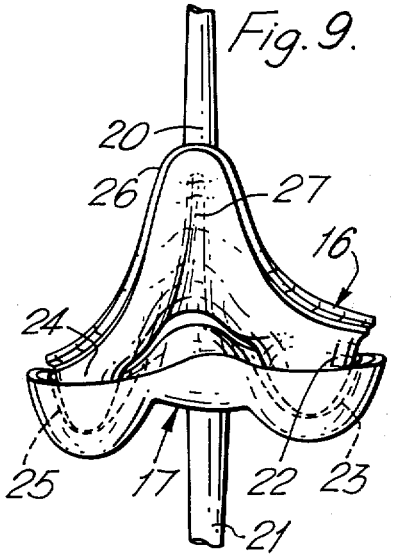
Fig. 10.
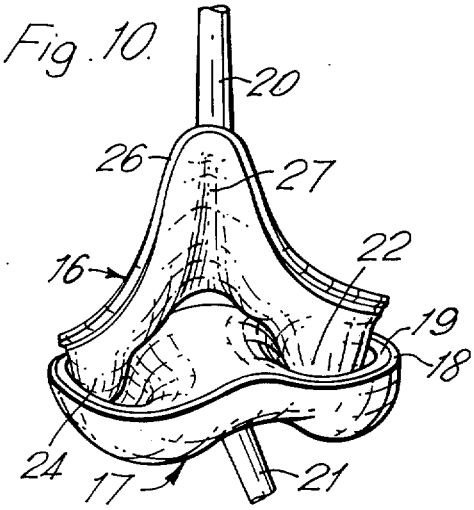

REPLACEMENTS FOR BICONDYLAR JOINTS IN HUMAN LIMBS

Matter enclosed in heavy brackets [ ] appears in the original patent but forms no part of this reissue specification; matter printed in italics indicates the additions made by reissue.

This invention relates to replacements for bicondylar joints in human limbs and has for an object to provide an artificial replacement or prosthetic implant for the natural joint structure which simulates as nearly as is reasonably possible the true action of a healthy joint which, through disease or damage, has to be replaced.

A bicondylar joint is one in which the members of the limb are articulated through two pairs of coacting male and female formations which serve both to carry the external loads normally imposed on the articulation and to govern the action of the articulated limb members during flexing and extension movements. Considering, by way of example, a knee which articulates the tibia to the femur, this joint is not a simple hinge having a single fixed axis of rotation. In flexion and extension the tibia navigates a helical course on the lower end of the femur, rotating outward on extension and inward on flexion. When the thigh muscles are relaxed, the tibia may be freely rotated on the femur, but when the muscles are contracted, and especially in weight bearing, there is synchronous rotation of the tibia on the femur, that is, the tibia always rotates outward when the knee joint extends, and inward when it flexes.

The lower end of the femur is bicondylar in shape. The medial condyle is longer and curved, while the lateral condyle is rounded, and acts as a ball-and-socket joint with the lateral condyle of the tibia. Thus, as the knee straightens, the medial condyle of the tibia rotates outward on the axis of the lateral, taking a longer course on the medial femoral condyle. Thus, the tibia moves on the femur between the fully flexed and the fully extended position in a generally helicoidal path under the control of the muscles in the thigh. It is the action of these muscles which ensures the stability of the joint.

The elbow joint is similarly constructed except that the counterparts in the forearm to the tibial condyles are formed separately on the radius and the ulna, respectively, and these two bones moves independently when the forearm pronates and supinates.

The present invention is a prosthetic implant or replacement assembly for a bicondylar joint in a human limb (whether natural or artifical) having two pairs of male and female condylar components, the male components comprising lateral and medial protruberances each engaging a complementary lateral or medial female component such that during flexion and extension of the joint, one of the two portions of the limb articulated by the joint deflects relative to the other simultaneously about axes in two planes at right angles, one plane lying substantially parallel to the general axis of the limb and the other lying substantially normal thereto. Thus, for example, the normal helicoidal motion of the tibia on the femur during flexion is reproduced by the implant.

A preferred feature of the invention is that the male lateral condylar component is a part-spherical or spheroidal protruberance and the coacting female lateral condylar component is a part-spherical or spheroidal socket of closely similar dimensions.

According to a further feature of the invention, the male medial condylar component is an arcuate rib or ridge having a curvature in each of the said two planes, the curvature in the substantially normal plane being centred at the common centre of the lateral components, and the coacting female condylar component is a groove having the same radius of curvature in the said normal plane but a greater radius of curvature than that of the ridge in the plane which is substantially parallel to the axis of the limb.

Alternatively, the contour of the base of the medial groove may be formed as an arc of a complex non-circular curve.

It is normally envisaged that the present invention will be applied to a natural complete limb (leg or arm) of a patient. In such a case, unless the entire joint has been damaged, as by widespread disease or complete fracture, as much as possible of the original bone surrounding the actual coacting bearing surfaces will be preserved intact, and only that part of each limb member which, in the healthy condition, included these surfaces will be removed, leaving a cavity into which will be fitted snugly a prosthetic implant or unit on which the replacement male or female surfaces are formed. This unit will then be secured in any appropriate way — as by adhesives or pegs — in such a way that the repaired limb will function in the same way as the original healthy limb.

The invention is, however, also applicable to artificial limbs, in which case the male and female components of the replacement joint assembly may be formed integrally with the respective artificial limb members.

A practical embodiment of the present invention will now be described by way of example only, as applied to a knee joint, with reference to the accompanying drawings in which:

FIG. 7 is a part-sectional anterior elevation of a replacement right knee joint in the extended or straight position;

FIG. 8 is a side elevation on the arrow VIII of FIG. 7;

FIG. 9 is a view similar to FIG. 7 showing the replacement joint in full elevation at the limit position of full extension, and FIG. 10 is a view similar to FIG. 9 showing the joint partly flexed.

Figure 1:
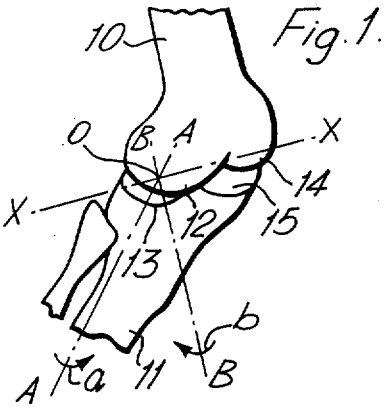
FIG. 1 is a diagrammatic representation of a flexed natural knee joint.
Figure 2:
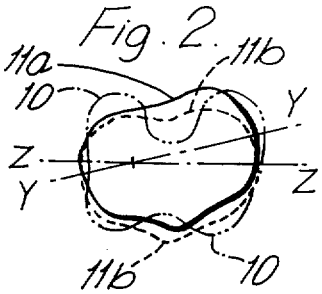
FIG. 2 is a composite under-plan view of the natural joint of FIG. 1 showing the two limit positions of the tibia.

Referring first to FIGS. 1 and 2, which are applicable to a right leg, the femur 10 and tibia 11 of a natural leg are articulated for rotation about a generally horizontal mean axis represented by the line X—X. The line A—A represents the axis of the tibia in flexion, and the line B—B represents the axis of the tibia in extension. These three axes intersect at a point 0 which represents the centre of a ball and socket joint the ball part 12 of which constitutes the lateral femoral condyle which works in a socket at 13 on the tibia.

The medial femoral condyle 14 partly rolls and partly glides on the coacting medial tibial condyle part 15, so that, as the tibia 11 moves between the flexed position represented by the axis A—A and the extended position represented by the axis B—B in FIG. 1, it also rotates on its longitudinal axis in the direction indicated by the arrow a in FIG. 1; whilst when it moves from the extended to the flexed position it rotates in the reverse direction, as indicated by the arrow b in FIG. 1. The directions of rotation illustrated are applicable to a right leg, and will, of course, be opposite for a left leg. During these flexing and extending movements of the tibia, the mean axis of rotation X—X is actually displaced angularly between limit positions shown at Y—Y and Z—Z in FIG. 2. This figure shows, in full lines at 11a, the position of the head of the flexed tibia relative to the bicondyloid end of the femur which is represented by the chain-dotted line 10; and in dotted lines at 11b the position of the head of the extended tibia relative to the femur. The figure thus illustrates how the mean axis of rotation X—X of FIG. 1 actually displaces through an angle centered at 0 from a flexed position Y—Y to an extended position Z—Z in FIG. 2.

While this angular displacement of the mean axis X—X of rotation of the knee joint has been taking place in a plane represented by FIG. 2 which is substantially normal to the general axis of the complete leg, another angular displacement of the axis X—X takes place in a plane substantially normal thereto—i.e. substantially parallel to the general axis of the complete limb. This is due to the motion of the femoral medial condyle 14 on its counterpart surface 15 on the tibia 11, and as a result the tibia performs a helicoidal motion during flexion under the control of the leg muscle.

In order to simulate this motion, and thus to avoid muscular strain or distortion, when repairing a damaged bicondylar limb joint, counterpart mechanical components are made which, according to the present invention, cooperate to constrain the tibia to move through the same path as that dictated by the natural condyles under the control of their associated muscles.

Figure 3:
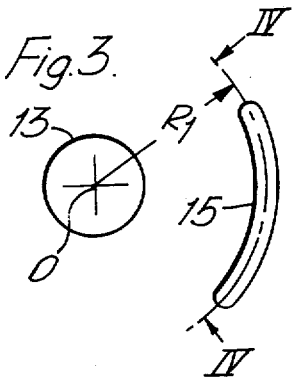
FIG. 3 is a schematic layout of the female components of a replacement assembly according to the present invention as seen in the plane which is substantially normal to the general axis of a leg.
Figure 4:
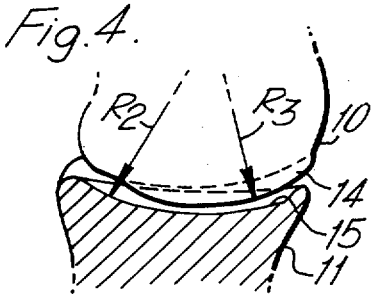
FIG. 4 is a part-sectional elevation on the line IV—IV of FIG. 3.

FIGS. 3 and 4 illustrate schematically the basic geometry of the knee joint which leads to the helicoidal motion of the tibia during flexion. In FIG. 3, the lateral tibial condyle 13 is represented as a part-spherical depression, and the medial tibial condyle 15 as an arcuate groove having a radius $R_1$ in the plane normal to the tibial axis. In FIG. 4, the medial tibial condyle 15 is shown as having a radius $R_2$ in a plane parallel to the tibial axis whilst the coacting femoral medial condyle 14 has a lesser radius $R_3$ in the same plane. The radius of the femoral medial condyle 14 in the plane of FIG. 3 is $R_1$; Thus, as the tibia 11 flexes on the femur 10, its medial condyle 15 rolls in the planes of both FIGS. 3 and 4 while its lateral condyle 13 twists on the femoral lateral condyle 12. In a natural joint the lateral condyles 12, 13 tend to be spheroidal rather than purely spherical.

Figure 5:
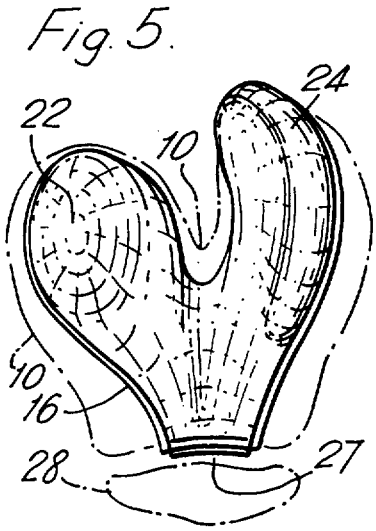
FIGS. 5 and 6 are plan views of the femoral and tibial condyles, respectively, of a replacement knee joint, the femur and tibia being shown lying parallel to each other with their medial sides adjacent.
Figure 6:
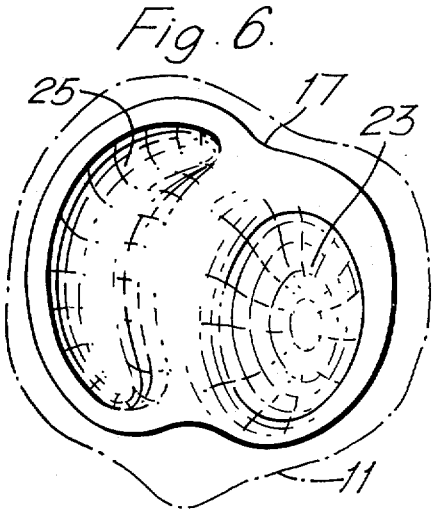

The invention embodies the above geometry in femoral (FIG. 5) and tibial (FIG. 6) replacement units 16, 17 respectively. In FIG. 5, the lateral condyle 22 of the femoral replacement unit 16 is of prolate spheroidal form — i.e. it forms a part of a sphere which is lengthened slightly in the anterior-posterior direction. This condylar protruberance mates with a similarly prolate spheroidal tibial lateral condylar socket in the replacement joint unit 17 of FIG. 6. The femoral medial condyle 24 of the replacement unit 16 (FIG. 5) is a curved rib which fits snugly, in the transverse direction, into a tibial medial condylar groove 25 (FIG. 6) in the replacement unit 17 in which the femoral condyle 24 is free to roll in the anterior-posterior direction.

One of the replacement units 16, 17 is preferably of metal and the other is preferably of a low-friction synthetic resin plastic material. As shown in FIG. 7, the femoral replacement unit 16 is of solid metal whilst the tibial replacement unit consists of a metal base or carrier 18 which is coated or lined with a layer of low-friction synthetic resin plastic material 19. Each unit 16, 17 has an integral rigid fixing peg or spike 20, 21 respectively for insertion, in conventional manner, into the bone to secure the respective implant firmly and rigidly in position. The size and shape of this peg or spike 20 or 21 is optional, and may be straight, curved, or shaped like a corkscrew to improve the grip normally provided by a cement or like fixative.

As seen in FIGS. 7–10, the femoral replacement unit 16 or implant may have an integral upward anterior extension 26 the outer face of which is shaped at 27 to simulate the trochlear groove which, in a healthy knee, locates the patella 28 (FIG. 5) which may itself be natural or artificial.

The two views of FIGS. 9 and 10 indicate the helicoidal excursion of the tibia relative to the femur during flexion with a replacement joint according to the present invention. In FIG. 9, the units or implants 16, 17 are shown in the extended position of the tibia. The femoral lateral and medial condyles 22, 24, respectively, nest in their respective coacting lateral and medial condyles 23, 25, the pegs 20, 21 being substantially parallel. The femoral medial condyle 24 rests on the base of the corresponding tibial medial condyle 25 at or near the anterior end of the latter. As the tibia flexes, the zone of contact between the replacement femoral and the tibial medial condyles moves posteriorly while that between the replacement lateral condyles 22, 23 remains in substantially the same position. Consequently, as seen in FIG. 10, the replacement tibial unit 17 both rotates and rolls outwards in a helicoidal path which is substantially identical with that of the natural knee joint.

The deepness of the tibial condyles 23, 25 and the snugness of their fit to the respective femoral condyles 22, 24 can be chosen at will according to the pathological condition of the particular limb under treatment, and contribute significantly to the stability of the replacement joint.

In a modification of the construction illustrated in FIG. 4 of the drawings, the radius $R_2$ is not constant over the full length of the tibial medial condylar groove 15, the base of the latter being an arc of a complex curve having a somewhat straighter or flatter intermediate section. The contour of the groove 25 in the tibial replacement unit 17 will then be correspondingly modified as required to restore the modified natural helicoidal motion of the tibia.

When the invention is to be applied to an elbow joint, the male condyles are shaped similarly to the femoral condyles 22 24 on a common prosthetic implant or unit to be secured to the humerus, but the female condyles, which are shaped similarly to the tibial condyles 23, 25 are separately mounted on the radius and the ulna respectively.

Although in the foregoing description the replacement male condyles 22, 24 have been described as femoral and the coacting female condyle formations 23, 25 as tibial, it is to be understood that this arrangement may, if preferred, be reversed so that the replacement male condyles are secured to the tibia and the coacting replacement female condyles are secured to the femur.

Furthermore, the replacement condyles on either the femur or the tibia, or on both, may be separate implants, or may be interconnected by a narrow bridge on the anterior or posterior side of the joint. Such modifications may be of advantage if it is desired to avoid detachment of the stabilizing ligaments.

I claim:

1. A replacement assembly for a bicondylar joint articulating two members of a human limb comprising two pairs of coacting male and female load-bearing condylar components, the male components consisting of one spherical or spheroidal protruberance and one arcuate ridge having a curvature in each of two planes at right angles, one of said planes being normal to the general axis of the limb when straight and the other being parallel to the said axis, the female components consisting of one spherical or spheroidal socket adapted to coact with the correspondingly shaped male component, and one arcuate groove being a curvature in each of the said two planes, the curvature of the arcuate ridge and the arcuate groove in the plane normal to the general axis of the limb being an arc of a circle struck about the centre of the sphere represented by the spherical or spheroidal components.

2. A replacement assembly as claimed in claim 1 wherein the curvature of the crest of the ridge in the plane parallel to the limb is less than that of the base of the arcuate groove in the same plane.

3. A replacement assembly as claimed in claim 1 wherein the male components are formed integrally on a common carrier, and the carrier is adapted to be secured to the limb.

4. A replacement assembly as claimed in claim 1 wherein the female components are formed integrally on a common carrier, and the carrier is adapted to be secured to the limb.

5. A replacement assembly as claimed in claim 1 wherein the components representing the condyles on one half of the joint are of metal and the coacting components are at least coated with a low-friction synthetic plastic material.

6. A replacement knee joint assembly comprising lateral and medial pairs of coacting condylar components, the lateral pair comprising a male femoral component in the form of a spherical or spheroidal protruberance and a female tibial component in the form of a coacting spherical or spheroidal socket, and the medial pair comprising a male femoral component in the form of a ridge having a curvature in a plane normal to the axis of the femur and a curvature in a plane parallel to the axis of the femur and a female tibial component in the form of a coacting groove having a curvature in a plane normal to the axis of the tibia and a curvature in a plane parallel to the axis of the tibia, the curvatures in the planes normal to the axes of the femur and the tibia being arcs of circles of the same radius struck about the effective centre of rotation of the lateral condylar components.

7. A replacement knee joint assembly as claimed in claim 6 having integral fermoral condylar components united on the anterior side by a forward and upward curved trochlear extension the anterior surface of which has a shallow groove for locating the patella.

8. A replacement elbow joint as claimed in claim 1 having integral male condylar components for fixation to the humerus and separate female condylar components for fixation to the radius and ulna respectively.

*9. A replacement assembly for a bicondylar joint articulating two members of a human limb comprising two pairs of coacting male and female load-bearing mechanical condylar components, the male components consisting of one spherical or spheroidal protruberance and one arcuate ridge having a curvature in each of two planes at right angles, one of said planes being normal to the general axis of the limb when straight and the other being parallel to the said axis, one of the female components being provided with a spherical or spheroidal socket adapted to coact with the correspondingly shaped male component and the other of the female components being provided with one arcuate groove having a curvature in at least one of the said two planes, the curvature of the arcuate ridge and the arcuate groove in the plane normal to the general axis of the limb being an arc of a circle struck about the center of the sphere represented by the spherical or spheroidal components.*

*10. A replacement assembly as claimed in claim 9 wherein said at least one of the said two planes is the plane normal to the general axis of the limb.*

*11. A replacement assembly as claimed in claim 9 comprising a common carrier supporting the male components, the carrier being adapted to be secured to one of the members of the limb.*

*12. A replacement assembly as claimed in claim 1 comprising a common carrier supporting the female components, the carrier being adapted to be secured to one of the members of the limb.*

*13. A replacement assembly as claimed in claim 9 wherein one pair of said components is of metal and the coacting pair of components includes a lining of a low-friction synthetic plastic material.*

*14. A replacement elbow joint as claimed in claim 9 having integral male condylar components for fixation to the humerus and separate female condylar components for fixation to the radius and ulna respectively.*

*15. A replacement knee joint assembly comprising lateral and medial pairs of coacting mechanical condylar components, the lateral pair comprising a male femoral component in the form of a spherical or spheroidal protruberance and a female tibial component in the form of a coacting spherical or spheroidal socket, and the medial pair comprising a male femoral component in the form of a ridge having a curvature in a plane intersecting the axis of the femur and a curvature in a second plane intersecting the first said plane and extending in generally the same direction as the axis of the femur and a female tibial component in the form of a coacting groove having a curvature in a plane intersecting the axis of the tibia, the curvatures in the planes intersecting the axes of the femur and the tibia being arcs of circles of the same radius concentric with the effective center of rotation of the lateral condylar components.*

*16. A replacement knee joint assembly as claimed in claim 15 comprising a forward and upward curved trochlear extension, said femoral condylar components being united on the anterior side by said trochlear extension the anterior surface of which has a shallow groove for locating the patella.*

* * * * *